United States Patent
Chang

(10) Patent No.: US 11,571,956 B2
(45) Date of Patent: Feb. 7, 2023

(54) CAR RAIN GUARD

(71) Applicant: Jiing-Duen Enterprise Co., Ltd., Taichung (TW)

(72) Inventor: Ching-Duan Chang, Taichung (TW)

(73) Assignee: Jiing-Duen Enterprise Co., Ltd., Taichung (TW)

(*) Notice: Subject to any disclaimer, the term of this patent is extended or adjusted under 35 U.S.C. 154(b) by 52 days.

(21) Appl. No.: 17/329,630

(22) Filed: May 25, 2021

(65) Prior Publication Data

US 2022/0048373 A1    Feb. 17, 2022

(30) Foreign Application Priority Data

Aug. 12, 2020 (TW) .................................. 109210382

(51) Int. Cl.
*B60J 11/08* (2006.01)
*B62D 27/06* (2006.01)

(52) U.S. Cl.
CPC .............. *B60J 11/08* (2013.01); *B62D 27/06* (2013.01)

(58) Field of Classification Search
CPC ........ B60J 11/08; B60J 1/2002; B60J 5/0494; B60J 1/20; B62D 27/06; B60R 13/07
USPC .................................................. 296/152, 154
See application file for complete search history.

(56) References Cited

U.S. PATENT DOCUMENTS

| | | | | |
|---|---|---|---|---|
| 2,034,342 A | * | 3/1936 | Hay | B60J 1/20 160/DIG. 3 |
| 2,575,933 A | * | 11/1951 | Thornewrotena | B60J 1/20 160/21 |
| 4,558,633 A | * | 12/1985 | Lingg | B60J 1/20 454/131 |
| 4,685,718 A | * | 8/1987 | Steenblik | B60J 1/20 454/131 |
| 4,923,241 A | * | 5/1990 | Miller | B60J 1/20 454/131 |
| 4,962,959 A | * | 10/1990 | Horwill | B60J 1/20 296/95.1 |
| 5,251,953 A | * | 10/1993 | Willey | B60J 1/2002 454/131 |
| 5,460,425 A | * | 10/1995 | Stephens | B60J 1/20 296/154 |
| 6,019,414 A | * | 2/2000 | Pourciau, Sr. | B60J 1/20 160/DIG. 4 |
| 7,172,240 B1 | * | 2/2007 | Kaufman | B60J 1/2002 454/131 |
| 11,220,161 B2 | * | 1/2022 | Rose | B60J 1/2002 |

* cited by examiner

*Primary Examiner* — Pinel E Romain
(74) *Attorney, Agent, or Firm* — Karin L. Williams; Alan D. Kamrath; Mayer & Williams PC

(57) ABSTRACT

A car rain guard which includes a rain shield and at least one magnetic member. The rain shield consists of an attach portion and a shield portion integrally extended from the attach portion. The attach portion is attached firmly to a surface above at least one door of a car body. An angle is formed between the attach portion and the shield portion so that the shield portion can be inclined from an inner side to an outer side to repel rain and drain water. The magnetic member is disposed on the attach portion of the rain shield so that the attach portion can be attached to and sealed on the surface detachably by magnetic attraction. Thereby the window can be left down enough, without worrying about rain splashing into the car. The rain guard is applied to a stopped car with an off engine.

17 Claims, 9 Drawing Sheets

CAR RAIN GUARD

BACKGROUND OF THE INVENTION

Field of the Invention

The present invention relates to a rain guard, especially to a rain guard which is able to be assembled and disassembled freely on cars.

Description of Related Art

In practice, a lot of drivers sometimes need to park their cars at specific locations for taking a nap or sleep. For certain reasons such as limits of regulations, ventilation issue, saving fuel, etc., the driver will switch off the engine and keep the window open for good ventilation. Especially for professional drivers, they have to drive for a long time and always keep alert and safe on the road. Some drivers will pull over the car and switch the engine off when they are burned out. Then they recline or lie down the driver's seat to take a rest or snooze with the open window (particularly rear windows). Thereby not only space in the car is well-ventilated and the car has no fuel consumption, compliance with regulations is also achieved.

However, on a rainy day, the rain blows in and get the inside of the vehicle wet when a window is rolled down. Thus, the driver needs to start the engine, put the windows up and turn on the air conditioner. Now the ventilation is poor, fuel is wasted, and the driver is breaking the law and facing fines for leaving the engine idling. Thereby this is a vexing issue.

Now some vehicles are provided with a window visor which not only allows drivers to keep windows open a bit for ventilation in rainy days by deflecting rain and strong wind, but also prevents window misting. Yet the window visor has only a limited effect on shielding rain drops. The little opening of the car window leads to poor ventilation, especially when the car is parked on the road and the engine is switched off without air-conditioning. Moreover, after some window visors being installed on the car, a loud wind noise is generally created while driving the car at high speed and the blind area caused by the A-pillar is also increased a little bit. The car visor may come off easily and further affect driving safety while in use. The adhesive reside causes aesthetic issue. Furthermore, some drivers think that the installation of the window visor has negative effect on the aesthetic value of the car. The window visor is difficult to be removed freely once has been installed on the car, which would ruin the aesthetics of the car.

SUMMARY OF THE INVENTION

Therefore, it is a primary object of the present invention to provide a car rain guard in which an attach portion of a rain shield can be installed on or removed from a car body freely according to users' needs by the design of at least one magnetic member arranged at the attach portion of the rain shield. The rain guard is not only easy and fast to assemble/disassemble but also securely mounted after installation and no adhesive residue is left after disassembly for aesthetic purposes. Moreover, the present car rain guard shields the interior of the car from rain drops much better than the conventional window visor and the window can be opened in a wider range. Thereby the window can be left open to maintain good ventilation while the car is stopped and the engine is switched off, without worrying about the rain getting into the car through the window.

In order to achieve the above objects, a car rain guard according to the present invention includes a rain shield and at least one magnetic member. The shield consists of an attach portion able to be attached to a surface above at least one door of a car body and a shield portion integrally extended from the attach portion. An angle is formed between the attach portion and the shield portion so that the shield portion is able to be inclined from an inner side to an outer side for rain shielding and water drainage. The magnetic member is arranged at the attach portion of the rain shield so that the attach portion can be attached to and sealed on the surface by magnetic force detachably.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
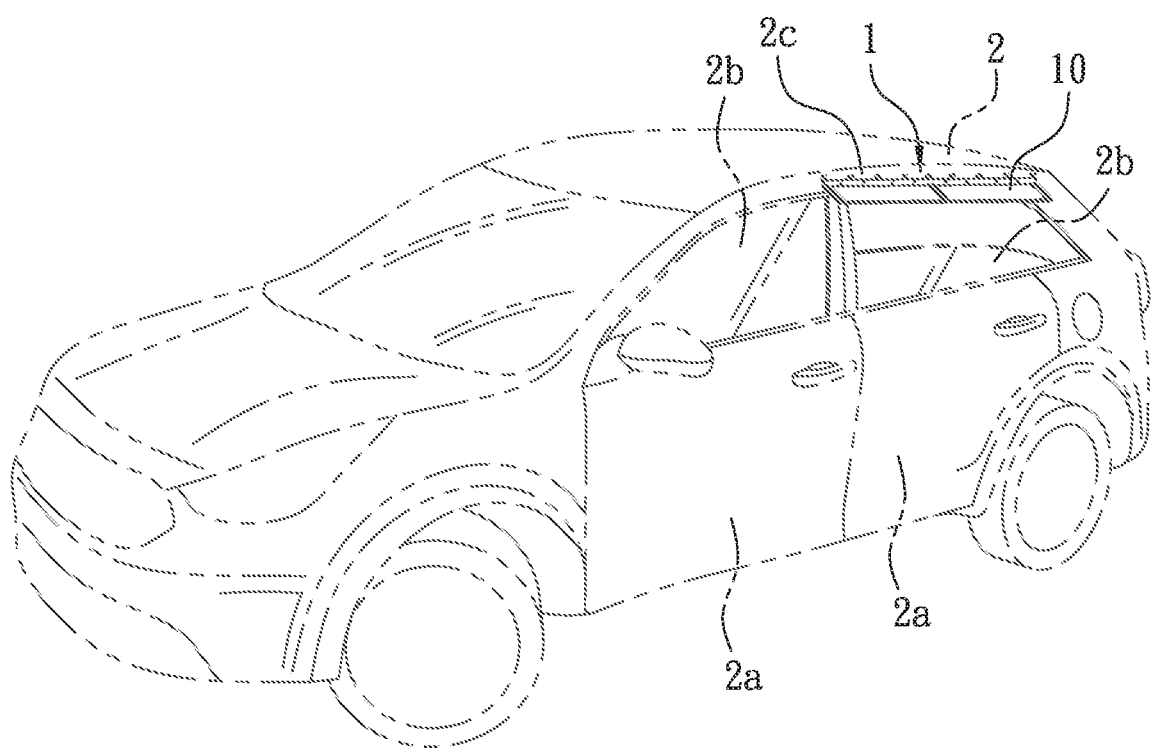
FIG. 1 is a schematic drawing showing an embodiment of a car rain guard installed on a car body according to the present invention.

Refer to FIG. 1, an embodiment of a car rain guard is revealed. A rain guard 1 is mounted to a car body 2 of a car. The car body 2 generally includes a plurality of doors 2a each of which is provided with a window 2b. The rain guard 1 is designed to be installed above one of the doors 2a or above at least one of the rear doors 2a to prevent rain from leaking into the car through the open window 2b under the rain guard 1.

Figure 2:
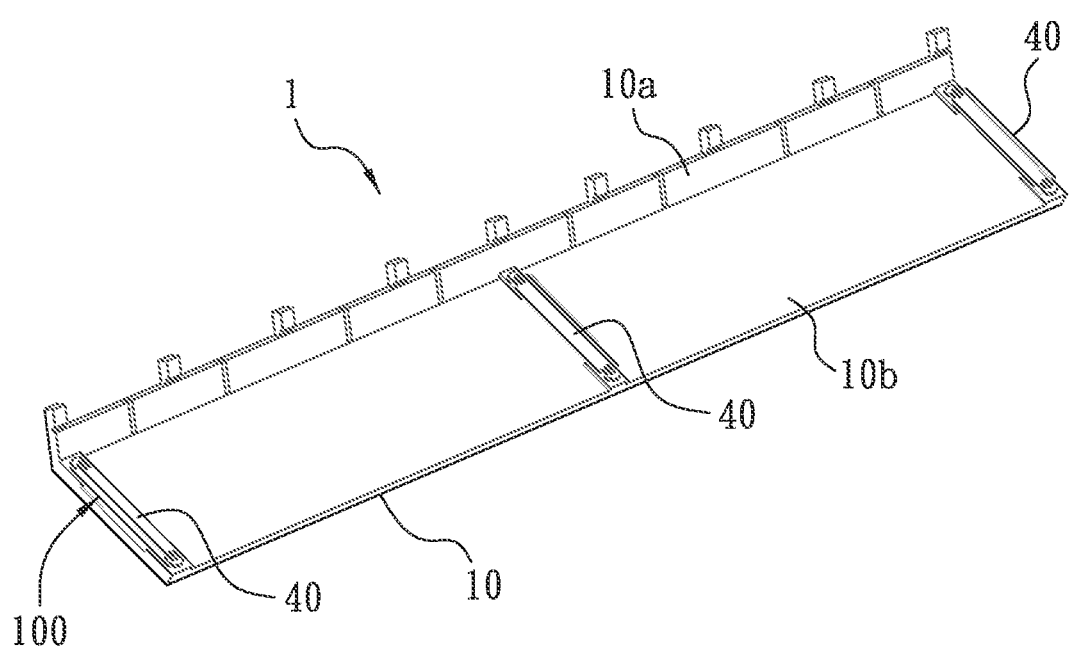
FIG. 2 is a perspective view of an embodiment of a car rain guard according to the present invention.
Figure 3:
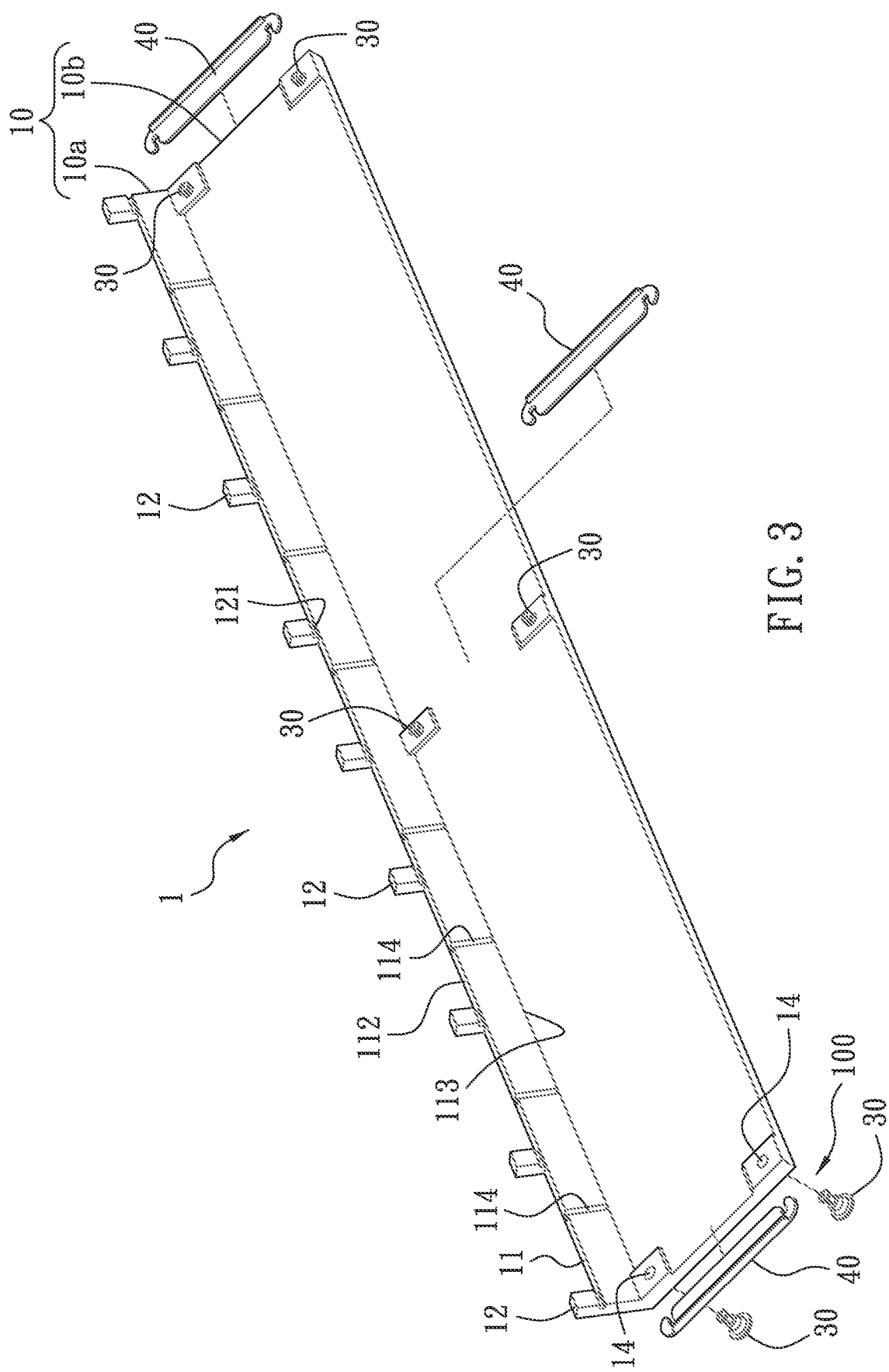
FIG. 3 is a partially exploded view of an embodiment of a car rain guard according to the present invention.

As shown in FIG. 2 and FIG. 3, the rain guard 1 of this embodiment includes a rain shield 10 and at least one magnetic member 20.

Figure 4:
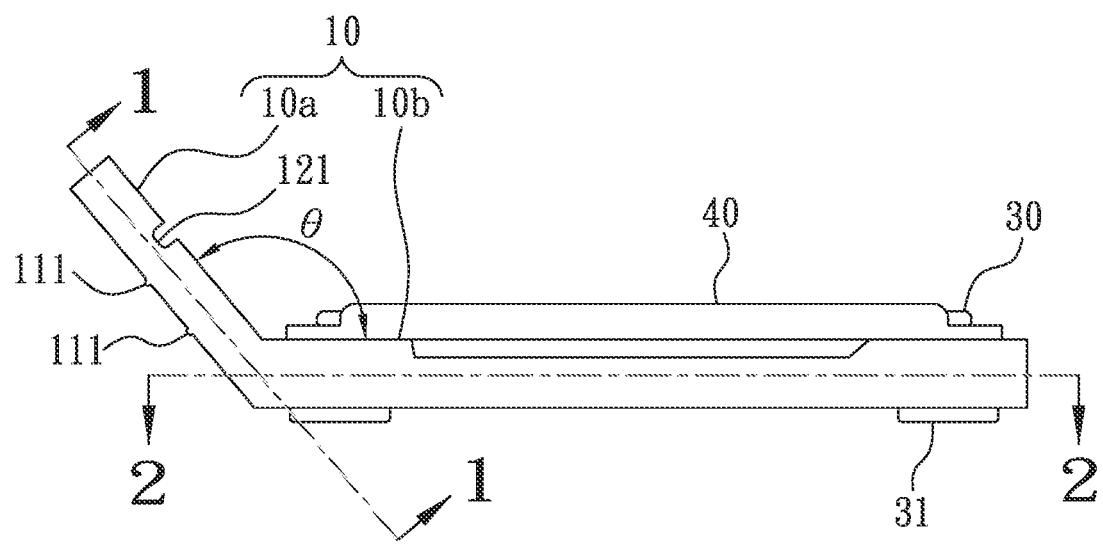
FIG. 4 is a side view of an embodiment of a car rain guard according to the present invention.
Figure 12:
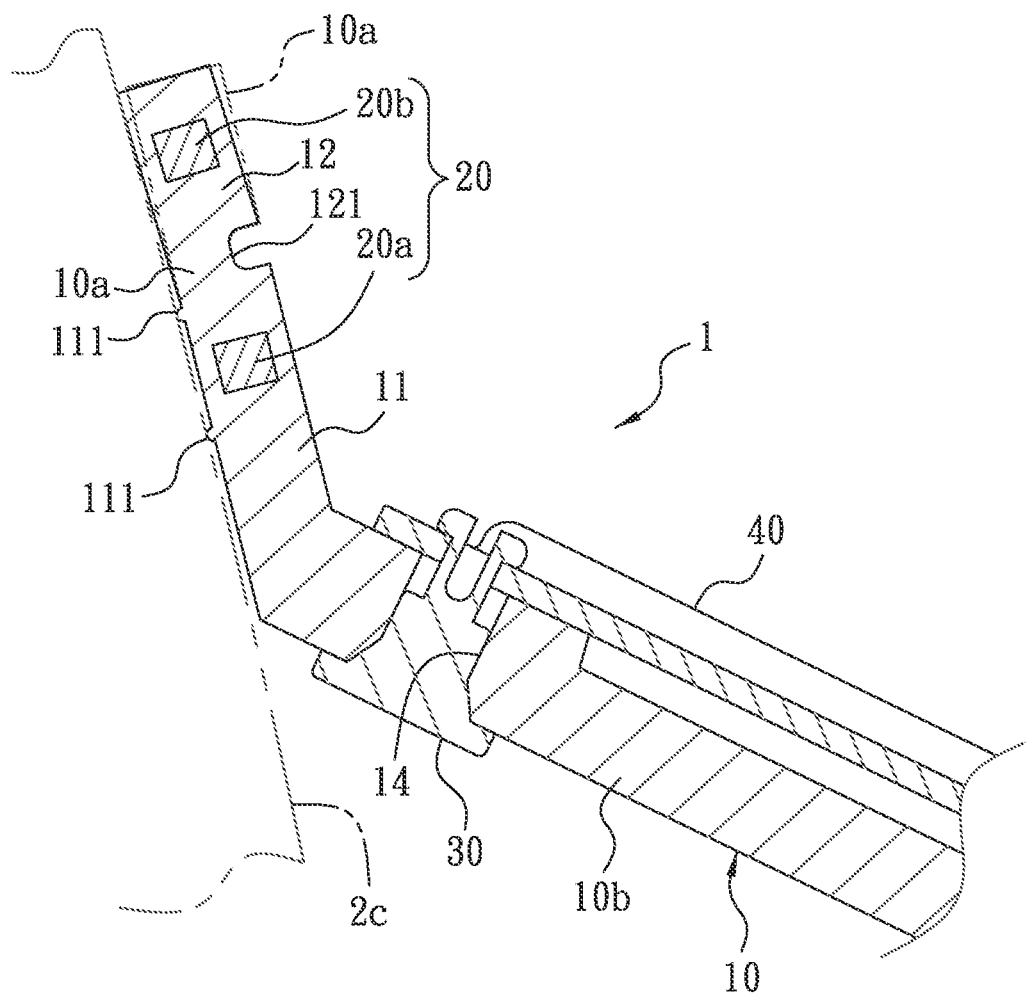
FIG. 12 is a schematic drawing showing a partial side view of a section of an embodiment assembled on a surface of a car body with a bit deformation on attachment area according to the present invention.

The rain shield 10 consists of an attach portion 10a and a shield portion 10b integrally extended from the attach portion 10a. As shown in FIG. 1 and FIG. 12, the attach portion 10a is attached firmly to a surface 2c above one of the doors 2a of the car body 2. Also refer to FIG. 4, an angle θ is formed between the attach portion 10a and the shield portion 10b so that the shield portion 10b is able to be inclined from an inner side to an outer side to repel rain and drain water.

In this embodiment, the shield portion 10b is integrally extended from the bottom side of the attach portion 10a and the angle θ is, but not limited to, about 130 degrees. The angle θ can be modified according to the angle the surface 2c of the car body 2 makes with the horizontal and usually ranging from 120 degrees to 140 degrees.

Figure 5:
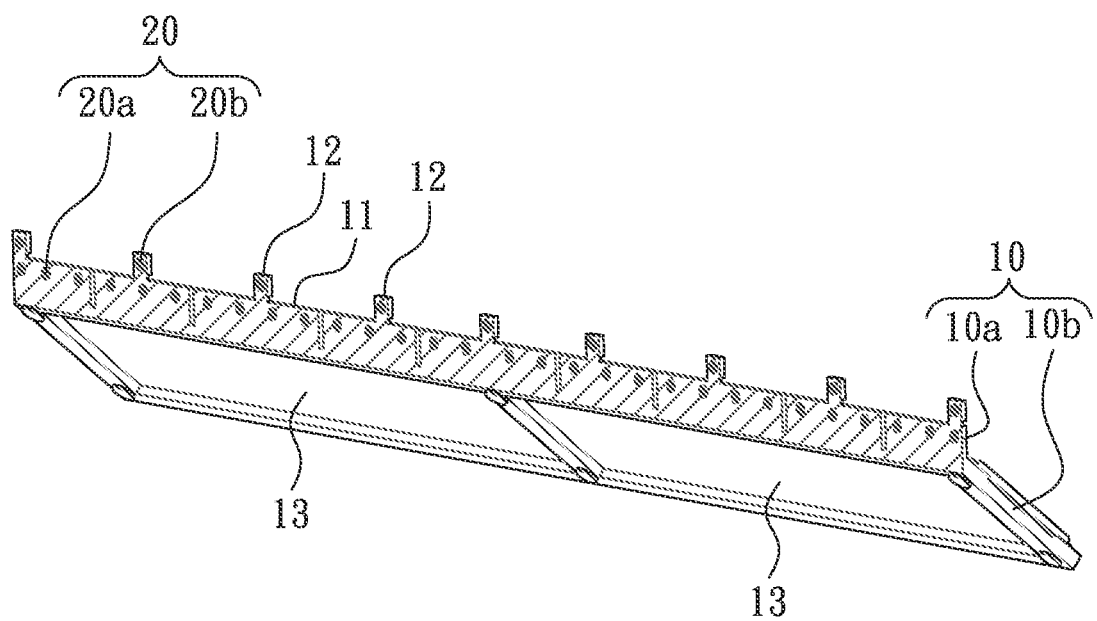
FIG. 5 is a sectional perspective view of the embodiment in FIG. 4 along the line 1-1 according to the present invention.

Refer to FIG. 5 and FIG. 12, the magnetic member 20 is arranged at the attach portion 10a of the rain shield 10 so that the attach portion 10a can be detachably attached to the surface 2c and sealingly connected to the surface 2c firmly. The magnetic member 20 can be a magnet.

In this embodiment, as shown in FIG. 5, a plurality of magnetic members 20 are mounted in the attach portion 10a. The rain shield 10 is integrally molded and made of rubber and plastic material while the magnetic member 20 is integrally enclosed in the attach portion 10a. The advantages of such design is in that not only an aesthetic appeal is provided, but the magnetic member 20 is also protected against issues such as coming off or damages. The design also protects the surface 2c of the car body 2 from scratches.

Figure 8:
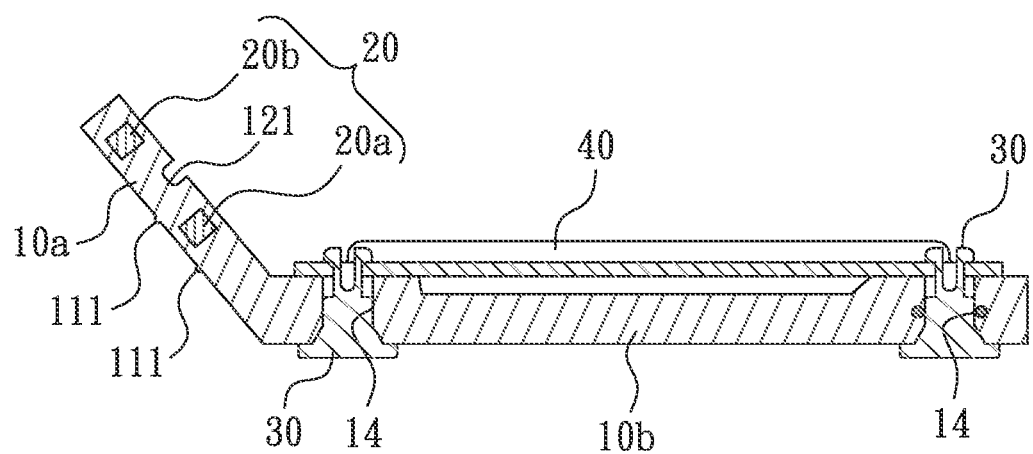
FIG. 8 is a side view of a section of the embodiment in FIG. 7 along the line 3-3 according to the present invention.

In this embodiment, as shown in FIG. 5 and FIG. 8, the attach portion 10a of the rain shield 10 is provided with a lengthwise extension portion 11 and a plurality of reinforcement portions 12 which are spaced from one another and extended upward from the top of the lengthwise extension portion 11. The magnetic member 20 consists of a plurality of first magnetic units 20a and a plurality of second magnetic units 20b mounted in the lengthwise extension portion 11 and the reinforcement portion 12 respectively. The first magnetic units 20a are arranged in lengthwise and spaced from one another.

In this embodiment, the reinforcement portion 12 is provided with a first slot 121 extended in the lengthwise direction of the rain guard 1 and located adjacent to the lengthwise extension portion 11, as shown in FIG. 3. Thus the reinforcement portion 12 is able to be bent flexibly at the first slot 121 for being attached to the surface 2c of the car body 2 along the curvature of the surface 2c more smoothly. As shown in FIG. 12, the tightness between the reinforcement portion 12 and the surface 2c is ensured to prevent rain from leaking through. Such design also creates sufficient magnetic attraction by keeping the distance between the first magnetic unit 20a and the surface 2c within a preset range. Thus the reinforcement portion 12 is securely attached to the surface 2c.

In this embodiment, at least one sealing rib 111 extending lengthwise is formed on an inner surface of the lengthwise extension portion 11 for abutting against and sealing on the surface 2c, as shown in FIG. 8 and FIG. 12. In this embodiment, there are two sealing ribs 111 arranged in lengthwise and spaced from each other for increasing the sealing performance and further preventing rain from leaking through a gap between the inner surface of the lengthwise extension portion 11 and the surface 2c.

In this embodiment, a plurality of second slots 114 is formed on a wall surface of an outer side of the lengthwise extension portion 11, spaced from each other lengthwise, and extended vertically from a top edge 112 to a bottom edge 113 of the lengthwise extension portion 11, as shown in FIG. 3. Thus the lengthwise extension portion 11 is also able to be bent flexibly at the respective second slots 114 whose function is similar to the first slot 121 for allowing the lengthwise extension portion 11 to be attached into the surface 2c of the car body 2 along the curvature of the surface 2c more smoothly and tightly. Thereby the sealing performance is ensured. Moreover, the distance between the first magnetic unit 20a and the surface 2c is kept in a preset range to generate sufficient magnetic attraction therebetween and further ensure firm attachment of the lengthwise extension portion 11 to the surface 2c.

In this embodiment, two recess portions 13 are formed on a bottom surface of the shield portion 10b so that the shield portion 10b is able to be bent flexibly at the recess portions 13, as shown in FIG. 5. Since the shield portion 10b is integrally connected with the attach portion 10a, the shield portion 10b may be affected once the shield portion 10b is too stiff. Especially the flexibility of the lengthwise extension portion 11 is easily affected so that the attachment and tightness between the lengthwise extension portion 11 and the surface 2c are further reduced.

It should be noted that the softer the rubber and plastic materials, the more flexible the rain shield 10. Yet the connection area between the shield portion 10b and the attach portion 10a is easy to be bent and deformed so that the angle θ which the shield portion 10b is inclined toward the attach portion 10a is difficult to be fixed at a preset value. This affects the rain shielding and further the service life. Moreover, the shield portion 10b is easy to be affected by external forces generated during packaging and transportation or by impact of rain so that the shield portion 10b is difficult to maintain the flatness. Thereby the aesthetic value, rain shielding and water drainage are further affected.

Figure 7:
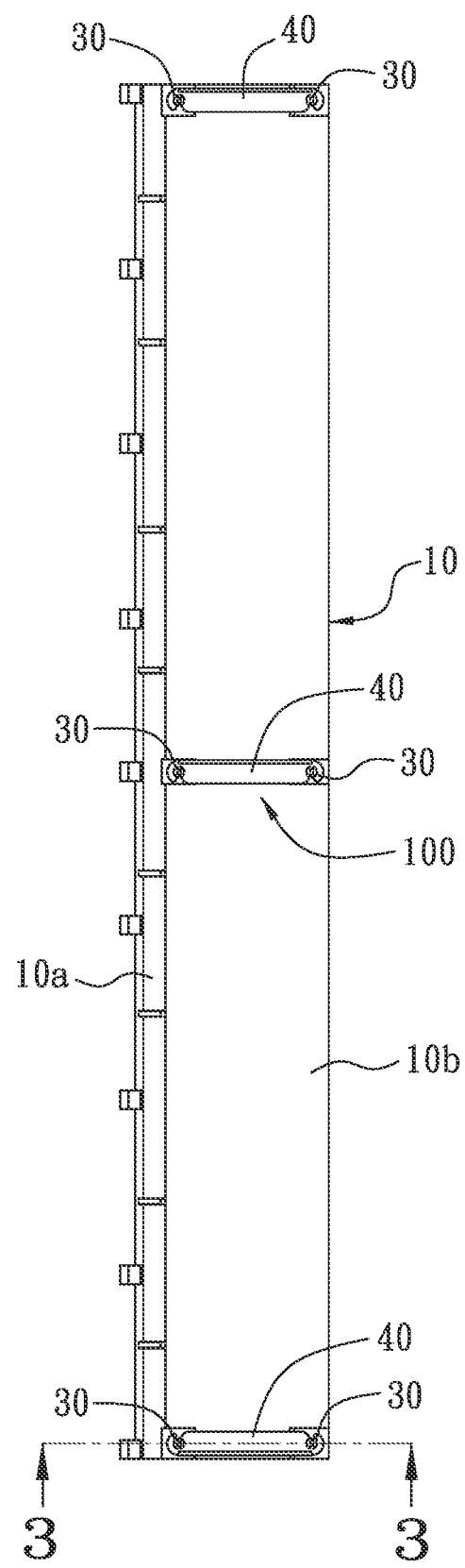
FIG. 7 is a top plan view of an embodiment of a car rain guard according to the present invention.
Figure 9:
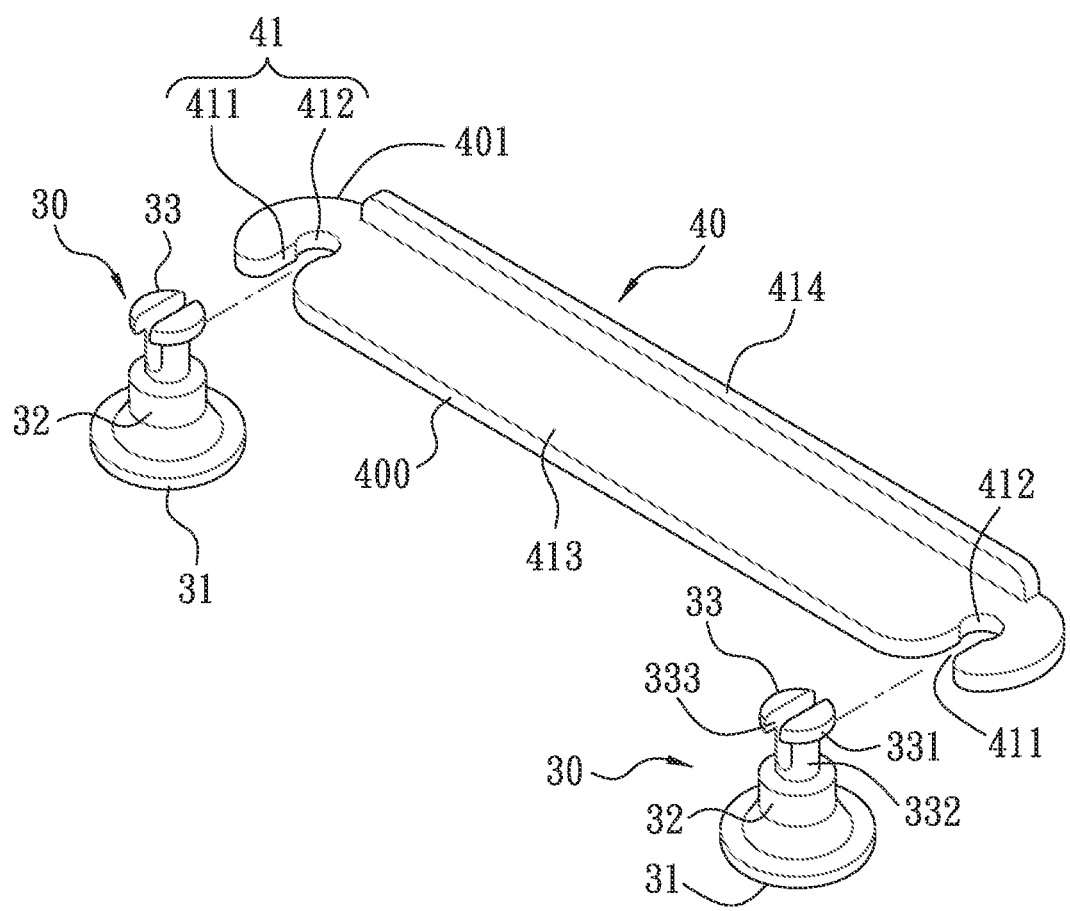
FIG. 9 is a perspective view of a locking button and a supporter of an exploded embodiment according to the present invention.
Figure 10:
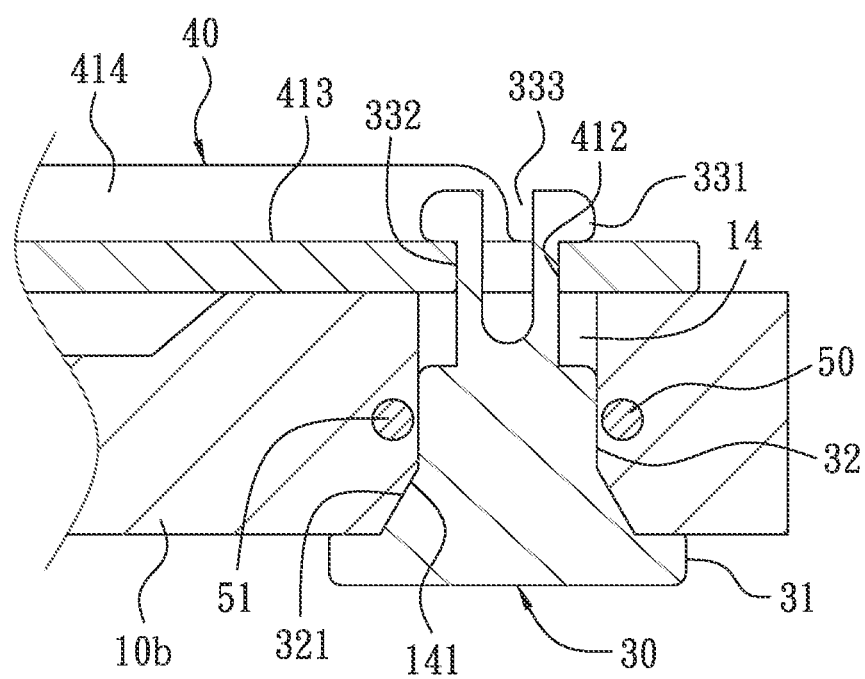
FIG. 10 is a partial side view of a section of a shield portion, a locking button, and a supporter of an embodiment according to the present invention.

In this embodiment, the rain guard 1 further includes at least one external support member 100 mounted to the shield portion 10b for strengthening and supporting the shield portion 10b, as shown in FIG. 3 and FIG. 7. The shield portion 10b is further provided with a plurality of assembly holes 14 while the external support member 100 consists of a plurality of locking buttons 30 and a plurality of supporters 40, as shown in FIG. 3 and FIG. 9. Each of the locking buttons 30 is mounted and positioned in the respective assembly holes 14, as shown in FIG. 10. Each of two ends of the supporter 40 is fastened and positioned by the opposite locking buttons 30.

In this embodiment, the assembly holes 14 are arranged in a set of two. The assembly holes 14 of the respective sets are disposed in the widthwise direction of the rain guard 1 while each of the supporters 40 is disposed on each set of the assembly holes 14 correspondingly and is also extended in the widthwise direction.

As shown in FIG. 2 and FIG. 3, the embodiment is provided with three sets of the assembly holes 14 which are located on two width sides and a middle portion of the shield portion 10b, six locking buttons 30, and three supporters 40. It should be pointed out that rain shield 10 can be designed to have a certain length according to different sizes/specifications of the window 2b of the respective car bodies 2 and the number of the supporters 40 is changed along with the length of the rain shield 10. Thus the number of the supporters 40 is not limited, as long as they are evenly distributed on the rain shield 10 for better support.

Figure 11:
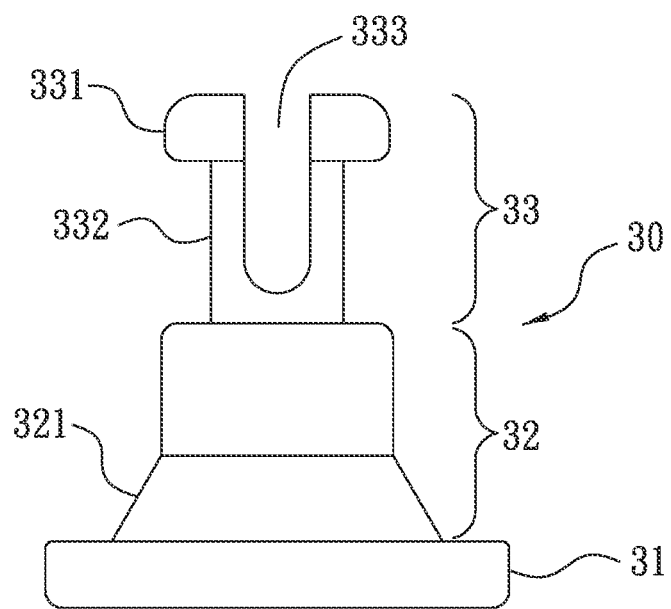
FIG. 11 is a side view of a locking button of an embodiment according to the present invention.

In particular, as shown in FIG. 9-11, the locking button 30 is composed of a hat-shaped head 31, an insertion portion 32 integrally extended from the hat-shaped head 31, and a locking portion 33 extended from the insertion portion 32. An outside diameter of the hat-shaped head 31 is larger than a pore size of the assembly hole 14 so that the hat-shaped head 31 is able to be stopped and limited outside a corresponding end of the assembly hole 14. The insertion portion 32 is inserted and mounted into the assembly hole 14 for sealing while the locking portion 33 allows the corresponding supporter 40 to be detachably locked and positioned thereon.

It should be noted that the locking button 30 is able to be mounted on the assembly hole 14 vertically such as from the bottom up or from the top down. According to the direction of the locking button 30 being mounted, the supporter 40 can be disposed and positioned above or under the shield portion 10*b*.

In this embodiment, as shown in FIG. 10 and FIG. 11, one end of the assembly hole 14 is provided with a conical wall 141 which diverges downward while the insertion portion 32 is provided with a conical surface 321 located at the position adjacent to the hat-shaped head 31 and attached to the corresponding conical wall 141 firmly to improve sealing performance and no water leakage caused by rain through the gap between the locking button 30 and the assembly hole 14

As to the locking portion 33, it consists of a locking edge 331 on one end, a neck segment 332 located between the locking edge 331 and the insertion portion 32, and a cut 333 through the locking edge 331 and the neck segment 332. Owing to the design of the cut 333, the neck segment 332 has elastic compression under act of external forces. In this embodiment, a small part of the neck segment 332 is located in the assembly hole 14 and an outside diameter of the locking edge 331 is designed to be smaller than an internal diameter of the assembly hole 14 and thus able to be inserted through the assembly hole 14 directly during the assembly process so that quick assembly is achieved.

Refer to FIG. 9, the supporter 40 in this embodiment is a strip of plate having a fastening slot 41 on each of two ends of one side 400. The fastening slot 41 is provided with a tapered guiding entrance 411 and a fastening hole 412. The neck segment 332 can be passed through the guiding entrance 411 after being compressed elastically and then expanded elastically in the fastening hole 412 for being fastened and limited in the fastening hole 412. Thereby the supporter 40 is also locked and limited between the locking edges 331 of the locking buttons 30 and a corresponding surface of the shield portion 10*b*.

In order to allow users to assemble and disassemble the supporter 40 conveniently, a long protruding part 414 is disposed on one side 401 on a surface 413 of the supporter 40, opposite to the side 400 with the fastening slots 41. Thereby users can push or pull the protruding part 414 in widthwise direction to assemble and fasten the respective fastening slots 41 of the supporter 40 with the corresponding neck segments 332 of the corresponding locking buttons 30, or disassemble and release the respective fastening slots 41 from the corresponding neck segments 332.

It should be noted that the design of the tapered guiding entrance 411 makes the respective neck segments 332 become easier to be mounted into the corresponding fastening holes 412. The outside diameter of the neck segment 332 is normally a bit larger than the minimum width of the guiding entrance 411 to ensure that the neck segment 332 is pressed and further elastically compressed while passing the guiding entrance 411. Thereby the neck segment 332 can be expanded elastically and returned automatically after being mounted into the fastening hole 412 and further locked and positioned in the fastening hole 412 without coming off easily while in use.

It should be added that the cut 333 is directional so that the locking button 30 can be rotated and adjusted to make the direction of the elastic compression of the segment 332 to be consistent with the direction of the tapered direction of the guiding entrance 411 while installing the supporter 40. Thereby the elastic compression of the segment 332 just allows the segment 332 to pass through the guiding entrance 411 smoothly.

Figure 6:
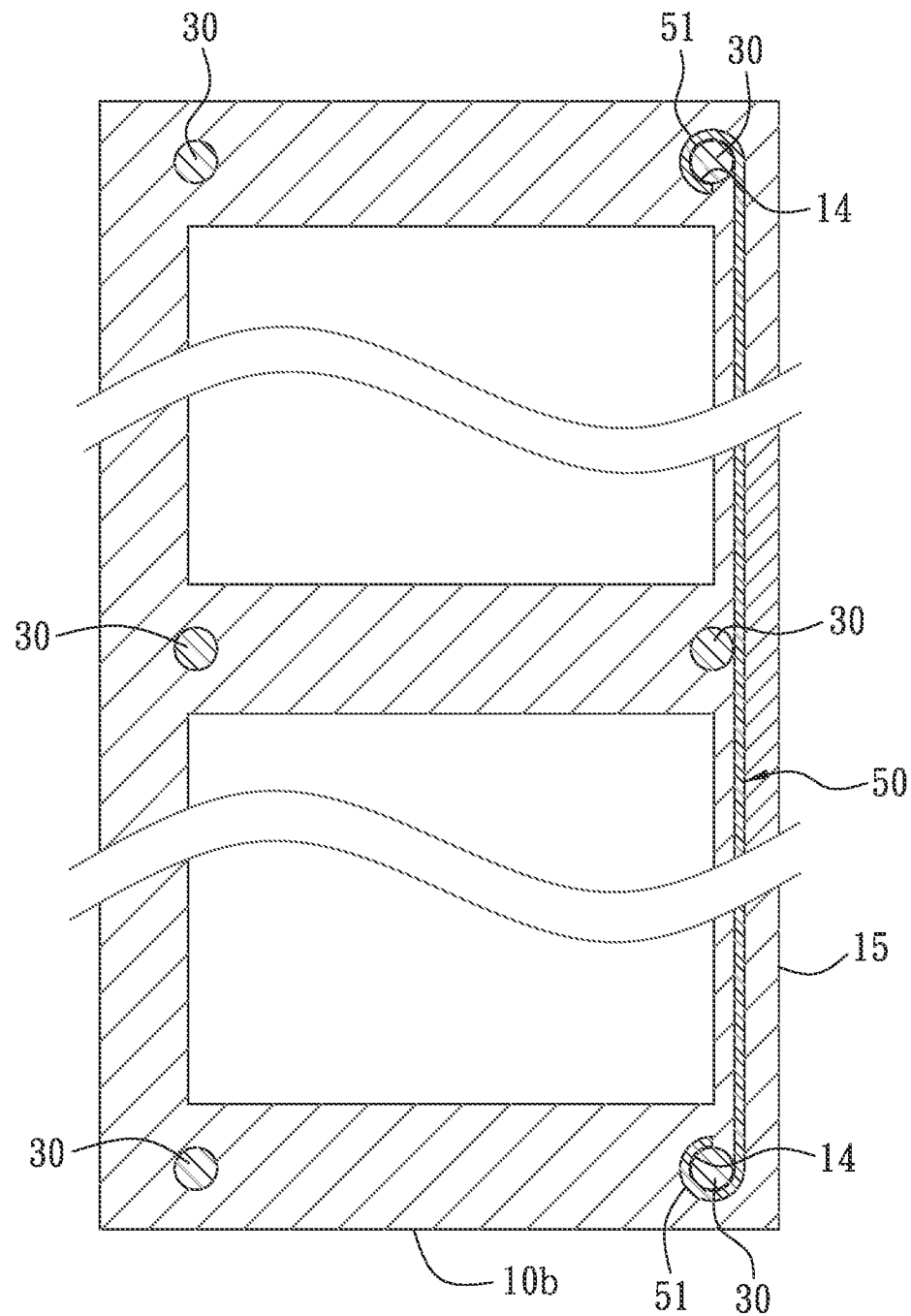
FIG. 6 is a partial sectional view of the embodiment in FIG. 4 along the line 2-2 according to the present invention.

As shown in FIG. 6, in this embodiment, the rain guard 1 further includes an internal support member 50 which is one part made of a metal strip and integrally enclosed in the shield portion 10*b* at the position close to a bottom edge 15. Each of two ends of the internal support member 50 is curved to form a curved segment 51 whose shape is similar to a circle and which is located around each of the assembly holes 14 located on the two width sides of the shield portion 10*b* and arranged opposite to each other. The design of the internal support member 50 improves the structural strength of a part of the shield portion 10*b* close to a bottom edge 15 to prevent bending and deformation of that part caused by external forces such as rain. Thereby the blocking of rain water and the beauty of the rain guard remain.

While in use, the attach portion 10 at of the present rain guard 1 is aligned with and leaning against the surface 2*c* above the selected door 2*a* of the car body 2. Then the rain guard 1 is installed easily and quickly by automatic magnetic adhesion and attachment of the first magnetic units 20*a* in the lengthwise extension portion 11 and the second magnetic units 20*b* in the respective reinforcement portion 12 to the surface 2*c*. The position of the rain shield 10 can be adjusted finely by horizontal movement, Users can also apply pressure to the attach portion 10*a* by their palms or fingers directly to ensure smooth attachment of the attach portion 10*a* to the surface 2*c*.

It should be noted that the present rain guard 1 is designed to be applied to stationary cars. For example, users often open all the window for ventilation because that they may need to take a rest or take a snap in the car (no matter lying down or not) while parking their cars at specific locations, especially when the car engine is turned off At the moment, the rain will not be dropped or split into the car by installation of the rain guard 1 over the open window 2*b*. Thereby the car is well ventilated and the user can sleep or rest in the car securely and comfortably. Moreover, while not in use or before the car starts moving, the rain guard 1 can be removed conveniently and quickly for storage in the car or the rear compartment, without occupying too much space inside the car.

In summary, the present rain guard 1 has the following features and functions.

1. Quick assembly/disassembly and the operation is easy and user-friendly. The rain guard 1 is directly attached to the surface 2*c* above the selected door 2*a* of the car body 2 by magnetic attraction of the magnetic members 20 in the attach portion 10*a*. Thus no specific tool is required for assembly and disassembly.
2. Secure installation. In the attach portion 10*a*, a plurality of magnetic members 20 are not only evenly distributed in the respective reinforcement portions 12 and the lengthwise extension portion 11 but also arranged in an up-and-down manner Such design ensures even and sufficient magnetic attraction between the attach portion 10*a* and the surface 2*c* of the car body 2. Owing the arrangement of the first slot 121, the second slot 114, and the recess portion 13, the attach portion 10*a* can have proper deformation along with the curved surface of the surface 2*c* of the car body 2 and thus attach to the surface 2*c* of the car body 2 more firmly. Such arrangement also helps the generation of the maximum magnetic force between the magnetic members 20 and the surface 2c to ensure the secure installation of the device.

3. Good scratch resistance to prevent scratches and damages on the surface 2c of the car body 2. The rain shield 10 of the rain guard 1 itself is integrally molded and made of rubber and plastic material with certain flexibility. The magnetic member 20 is also integrally enclosed in the rain shield 20. Thereby both the rain shield 10 and the magnetic member 20 will not scratch the surface 2c of the car body 2 during installation and usage. Moreover, compared with the attachment of the conventional rain guards with adhesive/glue, no adhesive residue is left on the surface 2c of the car body 2 after the present rain guard 1 being removed.

4. Excellent rain blocking. The rain shield 10 is mainly used when the car is stationary so that there is no need to consider wind noise generated during car movement and driving safety affected by coming off during the design of the device. Thus the design of the rain shield 10 is more flexible than that of the conventional visor. For example, the shield portion 10b can be designed to have a more suitable angle of inclination. The length of the shield portion 10b extended out of the car body 2 can be increased. Or the width of the shield portion 10b can be increased appropriately, even larger than the width of the window 2b. Thereby protection range and effect of the rain guard are significantly improved and users can roll down the window 2b to have a larger opening without worrying about rain entering through the window 2b. Moreover, the design of support structures such as the external support member 100 and the internal support member 50 mentioned above not only ensure good support of the rain shield 10 made of rubber and plastic materials with certain flexibility, but also prevent bending and deformation which further affect rain shielding and drainage flow.

5. The external support member 100 features on easy, fast and secure installation as well as sealing performance. Without specific tools, the locking buttons 30 and the plurality of supporters 40 can be mounted into the respective assembly holes 14 of the rain shield 10 easily and quickly. Good sealing performance is also achieved for preventing rain water from leaking through the respective assembly holes 14, without having negative effects on rain blocking.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A car rain guard comprising:
a rain shield which includes
an attach portion able to be attached firmly to a surface above at least one door of a car body, and
a shield portion integrally extended from the attach portion;
at least one magnetic member disposed on the attach portion of the rain shield;
wherein an angle is formed between the attach portion and the shield portion so that the shield portion is able to be inclined from an inner side to an outer side to block rain and drain water;
wherein the attach portion is able to be attached and sealingly connected to the surface by magnetic attraction detachably;
wherein the magnetic member is mounted in the attach portion,
wherein the car rain guard includes a plurality of the magnetic members each of which is integrally enclosed in the attach portion, wherein the rain shield is integrally molded and made of rubber and plastic material,
wherein the attach portion of the rain shield includes a lengthwise extension portion and a plurality of reinforcement portions which are spaced from one another and extended upward from the top of the lengthwise extension portion, wherein the magnetic member includes a plurality of first magnetic units and a plurality of second magnetic units mounted in the lengthwise extension portion and the reinforcement portion respectively, and wherein the first magnetic units are arranged lengthways and spaced from one another.

2. The device as claimed in claim 1, wherein the reinforcement portion is provided with a first slot arranged in the lengthwise direction of the car rain guard and located adjacent to the lengthwise extension portion so that the reinforcement portion is able to be bent flexibly at the first slot.

3. The device as claimed in claim 1, wherein at least one sealing rib extending lengthways is formed on an inner surface of the lengthwise extension portion for abutting against and sealing on the surface.

4. The device as claimed in claim 1, wherein a plurality of second slots is formed on a wall surface of an outer side of the lengthwise extension portion, spaced from each other lengthways, and extended vertically from a top edge to a bottom edge of the lengthwise extension portion so that the lengthwise extension portion is able to be bent flexibly at the respective second slots.

5. The device as claimed in claim 1, wherein at least one recess portion is formed on a bottom surface of the shield portion so that the shield portion is able to be bent flexibly at the recess portion.

6. The device as claimed in claim 1, wherein the rain guard further includes at least one external support member which is mounted to the shield portion for strengthening and supporting the shield portion.

7. The device as claimed in claim 6, wherein the rain shield is integrally molded and made of rubber and plastic material while the shield portion is provided with a plurality of assembly holes; wherein the external support member includes a plurality of locking buttons and a plurality of supporters; the locking buttons are mounted and positioned in the respective assembly holes while each of the supporters is provided with two ends fastened and positioned by the opposite locking buttons.

8. The device as claimed in claim 7, wherein the assembly holes are arranged in a set of two and the assembly holes of the respective sets are arranged in the widthwise direction of the rain guard while each of the supporters is disposed on each set of opposite assembly holes and is extended in the widthwise direction.

9. The device as claimed in claim 8, wherein the rain guard includes three sets of the assembly holes, six locking buttons, and three supporters; the three set of the assembly holes are located on two width sides and a middle portion of the shield portion.

10. The device as claimed in claim 9, wherein the rain guard further includes an internal support member which is one part made of a metal strip, integrally enclosed in the shield portion, and located close to a bottom edge of the shield portion; wherein the rain shield is integrally molded and made of rubber and plastic material; each of two ends of the internal support member is curved to form a curved segment which is located around each of the assembly holes which are located on the two sides of the shield portion and arranged opposite to each other.

11. The device as claimed in claim 7, wherein the locking button includes a hat-shaped head, an insertion portion integrally extended from the hat-shaped head, and a locking portion extended from the insertion portion; an outside diameter of the hat-shaped head is larger than a pore size of the assembly hole so that the hat-shaped head is able to be stopped and limited outside a corresponding end of the assembly hole; the insertion portion is inserted and mounted into the assembly hole for sealing while the locking portion allows the supporter to be detachably locked and positioned thereon.

12. The device as claimed in claim 11, wherein one end of the assembly hole is provided with a conical wall which diverges downward while the insertion portion is provided with a conical surface located adjacent to the hat-shaped head and attached to the conical wall firmly for sealing; wherein the locking portion includes a locking edge on one end, a neck segment located between the locking edge and the insertion portion, and a cut through the locking edge and the neck segment; the neck segment has elastic compression due to the cut; wherein the supporter is a strip of plate having a fastening slot on each of two ends of one side; the fastening slot is provided with a tapered guiding entrance and a fastening hole; wherein the neck segment is able to be passed through the guiding entrance while being compressed elastically and then returned and expanded elastically in the fastening hole for being fastened and positioned in the fastening hole; thereby the supporter is locked and limited between the locking edges of the locking button and a corresponding surface of the shield portion.

13. The device as claimed in claim 12, wherein a protruding part to which a force is applied manually is disposed on one side on a surface of the supporter.

14. The device as claimed in claim 1, wherein the shield portion is integrally extended from the bottom side of the attach portion and the angle is ranging from 120 degrees to 140 degrees.

15. The device as claimed in claim 14, wherein the angel is about 130 degrees.

16. The device as claimed in claim 1, wherein the rain guard further includes an internal support member which is integrally enclosed in the shield portion and located close to a bottom edge of the shield portion; wherein the rain shield is integrally molded and made of rubber and plastic material.

17. The device as claimed in claim 16, wherein the internal support member is one part made of a metal strip.

* * * * *